(12) United States Patent
Havaldar

(10) Patent No.: US 8,842,933 B2
(45) Date of Patent: Sep. 23, 2014

(54) FACIAL MOTION CAPTURE USING MARKER PATTERNS THAT ACCOMMODATE FACIAL SURFACE

(75) Inventor: Parag Havaldar, Culver City, CA (US)

(73) Assignees: Sony Corporation, Tokyo (JP); Sony Pictures Technologies Inc, Culver City, CA (US)

( * ) Notice: Subject to any disclaimer, the term of this patent is extended or adjusted under 35 U.S.C. 154(b) by 842 days.

(21) Appl. No.: 12/938,317

(22) Filed: Nov. 2, 2010

(65) Prior Publication Data

US 2011/0110561 A1    May 12, 2011

Related U.S. Application Data

(60) Provisional application No. 61/259,962, filed on Nov. 10, 2009.

(51) Int. Cl.
  *G06K 9/36*   (2006.01)
  *G06T 13/40*  (2011.01)
  *G06T 7/20*   (2006.01)

(52) U.S. Cl.
  CPC ....... *G06T 13/40* (2013.01); *G06T 2207/30204* (2013.01); *G06T 2207/30201* (2013.01); *G06T 7/2046* (2013.01)
  USPC .......................................... 382/276; 382/118

(58) Field of Classification Search
  USPC ......................................... 382/115, 118, 127
  See application file for complete search history.

(56) References Cited

U.S. PATENT DOCUMENTS

| | | | |
|---|---|---|---|
| 2006/0023923 A1* | 2/2006 | Geng et al. | 382/116 |
| 2008/0024505 A1* | 1/2008 | Gordon et al. | 345/473 |
| 2008/0025569 A1* | 1/2008 | Gordon et al. | 382/103 |
| 2008/0100622 A1* | 5/2008 | Gordon | 345/427 |
| 2009/0153569 A1* | 6/2009 | Park et al. | 345/474 |

\* cited by examiner

*Primary Examiner* — Edward Park
(74) *Attorney, Agent, or Firm* — Procopio, Cory, Hargreaves & Savitch, LLP

(57) ABSTRACT

Capturing facial surface using marker patterns laid out on the facial surface by adapting the marker patterns to contours of the facial surface and motion range of a head including: generating a facial action coding system (FACS) matrix by capturing FACS poses; generating a pattern to wrap over the facial surface using the FACS poses as a guide; capturing and tracking marker motions of the pattern; stabilizing the marker motions of the pattern using a head stabilization transform to remove head motions from the marker motions; and generating and applying a plurality of FACS matrix weights to the stabilized marker motions.

12 Claims, 7 Drawing Sheets

FACIAL MOTION CAPTURE USING MARKER PATTERNS THAT ACCOMMODATE FACIAL SURFACE

CROSS-REFERENCE TO RELATED APPLICATIONS

This application claims the benefit of priority under 35 U.S.C. §119(e) of U.S. Provisional Patent Application No. 61/259,962, filed Nov. 10, 2009, entitled "Facial Motion Capture." The disclosure of the above-referenced application is incorporated herein by reference.

BACKGROUND

1. Field of the Invention

The present invention relates to motion capture, and more specifically, to capturing motion and surfaces of an actor.

2. Background

Motion capture systems are used to capture movements of actors and/or objects and map them onto computer-generated objects as a way of animating them. These systems are often used in the production of motion pictures and video games for creating a digital representation of actors and/or objects for use as source data to create a computer graphics ("CG") animation. In a typical system, an actor wears a suit having markers attached at various locations (e.g., small reflective markers are attached to the body and limbs). Appropriately placed digital cameras then record the actor's body movements in a capture volume from different angles while the markers are illuminated. The system later analyzes the images to determine the locations (e.g., spatial coordinates) of the markers on the actor's suit in each frame. By tracking the locations of the markers, the system creates a spatial representation of the markers over time and builds a digital representation of the actor in motion. The motion is then applied to a digital model in virtual space, which may be textured and rendered to produce a complete CG representation of the actor and/or the performance. This technique has been used by special effects companies to produce realistic animations in many popular movies.

SUMMARY

Implementations of the present invention provide for facial motion capture using marker patterns that accommodate facial surface.

In one implementation, a method of capturing facial surface using marker patterns laid out on the facial surface by adapting the marker patterns to contours of the facial surface and motion range of a head is disclosed. The method includes: generating a facial action coding system (FACS) matrix by capturing FACS poses; generating a pattern to wrap over the facial surface using the FACS poses as a guide; capturing and tracking marker motions of the pattern; stabilizing the marker motions of the pattern using a head stabilization transform to remove head motions from the marker motions; and generating and applying a plurality of FACS matrix weights to the stabilized marker motions.

In another implementation, a system to capture facial surface using marker patterns laid out on the facial surface by adapting the marker patterns to contours of the facial surface and motion range of a head is disclosed. The system includes: a facial action coding system (FACS) matrix capturing module configured to generate FACS matrix by capturing FACS poses; a texturing module configured to generate a pattern to wrap over the facial surface using the FACS poses as a guide; a tracking module configured to capture and track marker motions of the pattern; a head stabilization transform configured to stabilize the marker motions of the pattern to remove head motions from the marker motions; and a plurality of FACS matrix weights configured to apply to the stabilized marker motions.

In another implementation, a non-transitory storage medium storing a computer program for capturing facial surface using marker patterns laid out on the facial surface by adapting the marker patterns to contours of the facial surface and motion range of a head is disclosed. The computer program comprising executable instructions that cause a computer to: generate a facial action coding system (FACS) matrix by capturing FACS poses; generate a pattern to wrap over the facial surface using the FACS poses as a guide; capture and tracking marker motions of the pattern; stabilize the marker motions of the pattern using a head stabilization transform to remove head motions from the marker motions; and generate and apply a plurality of FACS matrix weights to the stabilized marker motions.

Other features and advantages of the present invention will become more readily apparent to those of ordinary skill in the art after reviewing the following detailed description and accompanying drawings.

DETAILED DESCRIPTION

Figure 1:
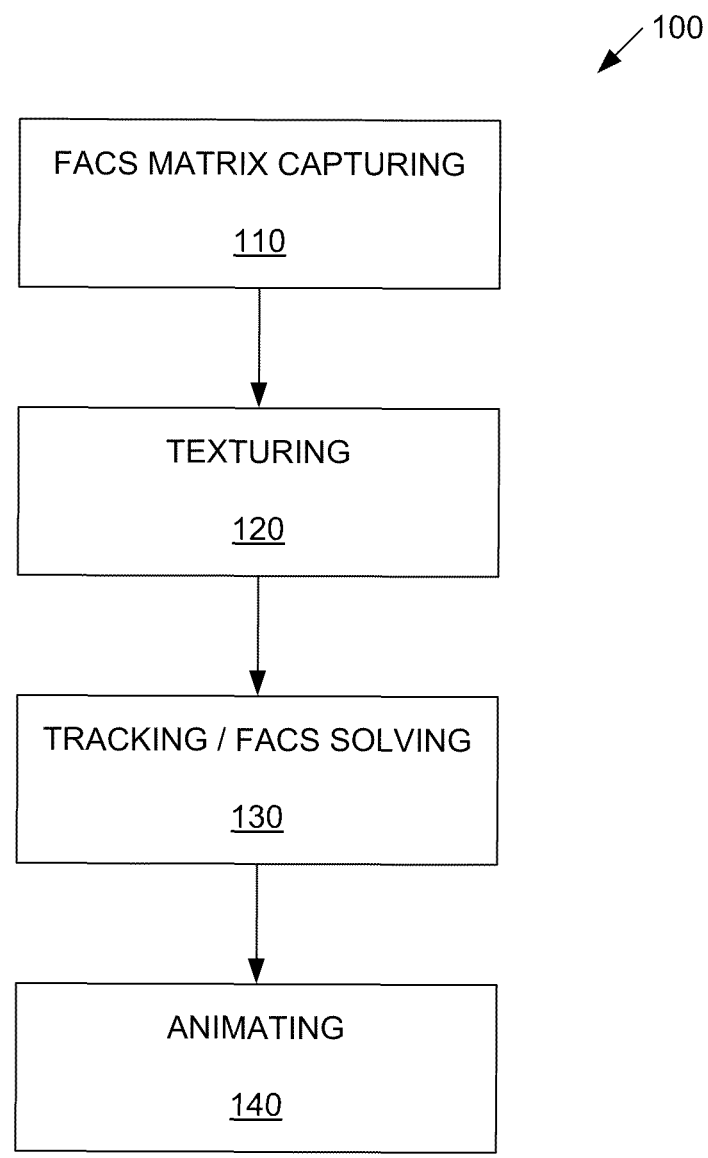
FIG. 1 is a functional block diagram illustrating a technique for facial motion capture using marker patterns that accommodate facial surface in accordance with one implementation of the present invention.

Certain implementations as disclosed herein include facial motion capture using marker patterns that accommodate facial surface. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Various implementations include techniques for capturing motion and surfaces of an actor. In particular, techniques provide patterns for accommodating facial surface for motion capture. In one implementation, a pattern of markers are drawn on an actor's face in groups based on a human face. The number and layout of markers reflect the shape and motion range of a face. Thus, the marker patterns are designed to provide high quality data (e.g., less lost markers) and fast recognition and labeling (e.g., improved performance of analysis).

In one implementation, patterns of markers are applied to an actor's body, such as on the face. These patterns are designed to accommodate the nature of a facial surface as well as the needs of the capture and processing system that receives and uses the derived data. Different marker patterns can have different effects in how the data is processed. In one example, a pattern that is adapted to the contours of a facial surface is used to produce higher quality data than a simple grid of regularly-spaced markers. Markers in a strict grid may miss some features or suffer more from occlusion (where a marker is not visible to a camera). In some situations, even the marker position might not be as useful if it does not translate into a position in the vicinity of a deforming muscle. In another example, to ensure being able to track reasonably well in changing lighting condition, pen-marks can be used to get high contrast areas on the face to track. In yet another example, no added marks are used as long as enough texture details are seen on the face so that the marker layout can be done more in a digital layout phase (e.g., a possibility with higher resolution cameras).

In another implementation, a motion capture system is able to capture useful data in the presence of varying lighting conditions onset. The system includes a film camera and two witness cameras directed at the face and/or body of the actor, along with the backend software to track markers in image plates and solve the tracks. The output of the system is then applied to create animations on digital heads and bodies. With only the knowledge of the actor's shot action a priori (without any restrictions on where the actor can be and what the actor needs to do), video witness cameras are placed at possible vantage points to gather most useful data. In contrast, a traditional motion capture setup, which consists of many infrared cameras with retro-reflective markers, needs a strong immobile setup.

FIG. 1 is a functional block diagram illustrating a technique 100 for facial motion capture using marker patterns that accommodate facial surface in accordance with one implementation of the present invention. The technique 100 includes a facial action coding system (FACS) matrix capturing process 110, a texturing process 120, a tracking/FACS solving process 130, and an animation process 140. Although the illustrated implementation of FIG. 1 shows these processes in one order, the processes can be executed in any order which makes sense.

In one implementation, the FACS matrix capturing process 110 includes capturing a neutral pose and FACS poses (for details on FACS poses see U.S. Patent Publication No. 20100045680 entitled "Performance Driven Facial Animation" by the same inventor) using a multi-camera setup. The selections are then made to build the poses. Further, 3-D marker motions are built using triangulation from the multi-camera setup. A global head transformation is then computed, which transforms the head position as it moves with the body to a locked position around an origin. This zeros out the motion due to head movement from the facial markers and thus restricts the motion of markers only to facial expressions. The markers from the selections are then isolated and identified to go into each FACS pose required by the system. This may be done by cutting and pasting markers to isolate actions as needed.

In one implementation, the texturing process 120 includes creating a pattern to wrap over the actor's face with marker dots intact. The texturing process 120 also includes augmenting of a model of the actor based on an artistic direction. The model is driven by a system which was used to generate the FACS poses. The image and FACS pose reference is used as a guide to construct a set of 3-D model FACS poses to match the intention of each action.

In one implementation, the tracking/FACS solving process 130 includes 2-D marker tracking and selection of a set of rigid markers to derive the overall head motion in a screen space. As was the case with a head stabilization transform of 3-D markers, a transformation process is needed to stabilize the head calculated from the 2-D markers. However, in the 2-D case, the markers are shown on the flat screen of the video (i.e., the screen space). Therefore, there is a need to compute a stabilization transform from the 3-D space to the 2-D screen space to compute this stabilization. By this stabilization computation, which is mathematically a camera projection, the head orientation and head translation motion is then removed from the motions of the 2-D markers, which makes the 2-D marker motions suitable for a FACS solver. The screen space motions can be a result of camera or head motions. The FACS solver overlays the projected 3-D marker motions and the 2-D marker motions, and pairs up the corresponding points and matches the performance by computing appropriate "blending" weights between the FACS poses. Thus, the FAC solver solves for a weighted combination of predetermined facial muscle activations per pose on every frame.

In one implementation, the animation process 140 includes a shot facial animation process in which FACS matrix weights are applied and the shot is evaluated. The animation controls (e.g., by animators) are layered on top of the FACS solving process to augment and enhance the animation.

Figure 2:
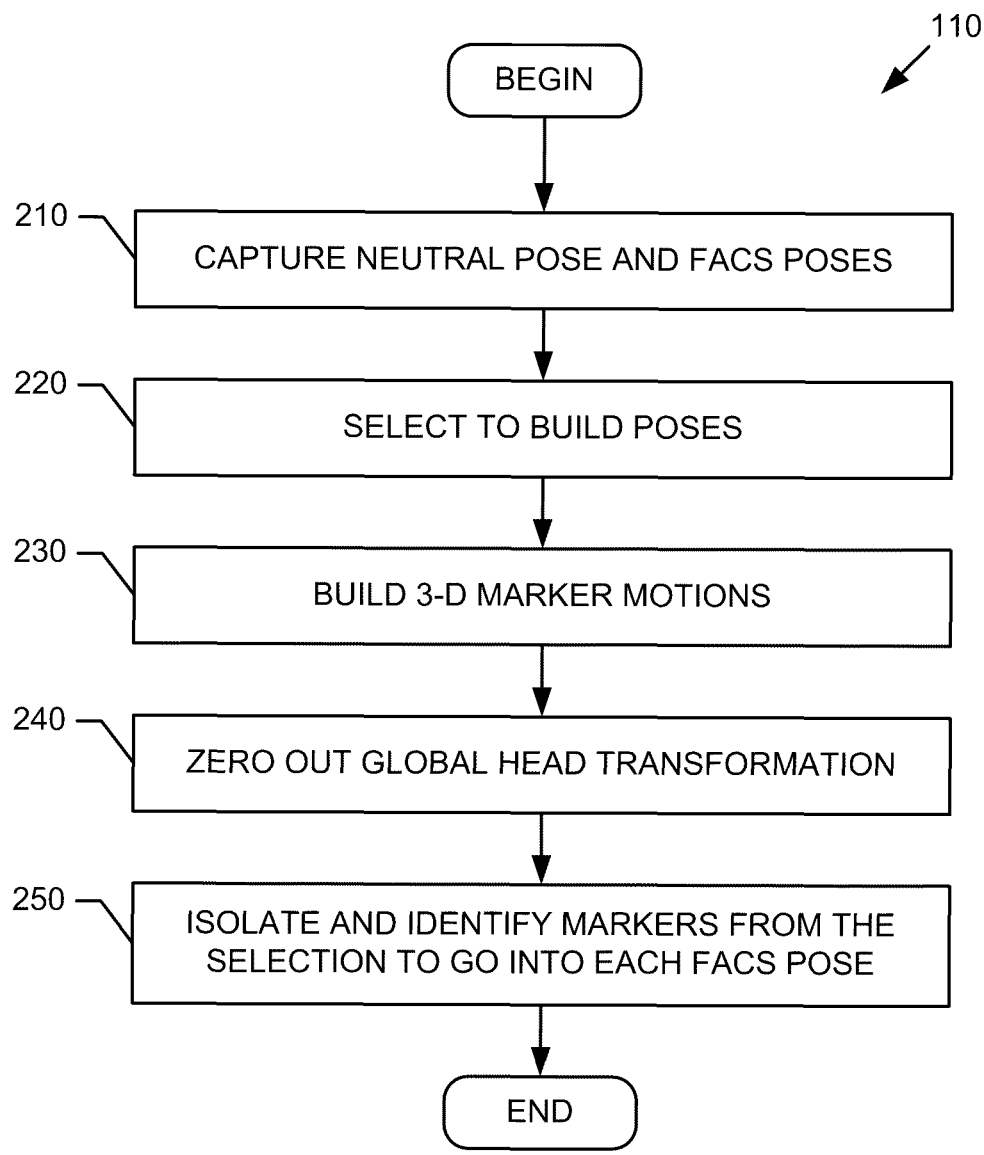
FIG. 2 is a flowchart illustrating a detailed FACS matrix capturing process in accordance with one implementation of the present invention.

FIG. 2 is a flowchart illustrating a detailed FACS matrix capturing process 110 in accordance with one implementation of the present invention. The process 110 includes capturing a neutral pose and FACS poses, at box 210. In one implementation, the poses are captured using a multi-camera setup. The selections are then made, at box 220, to build the poses. Further, at box 230, 3-D marker motions are built using triangulation from the multi-camera setup. At box 240, a global head transformation is zeroed out to put markers in a new space. As discussed above, the global head transformation transforms the head position as the head moves with the body to a locked position around an origin. This zeros out the motion due to head movement from the facial markers and thus restricts the motion of markers only to facial expressions. The markers from the selections are then isolated and identified, at box 250, to go into each FACS pose required by the system. This may be done by cutting and pasting markers to isolate actions as needed.

Figure 3:
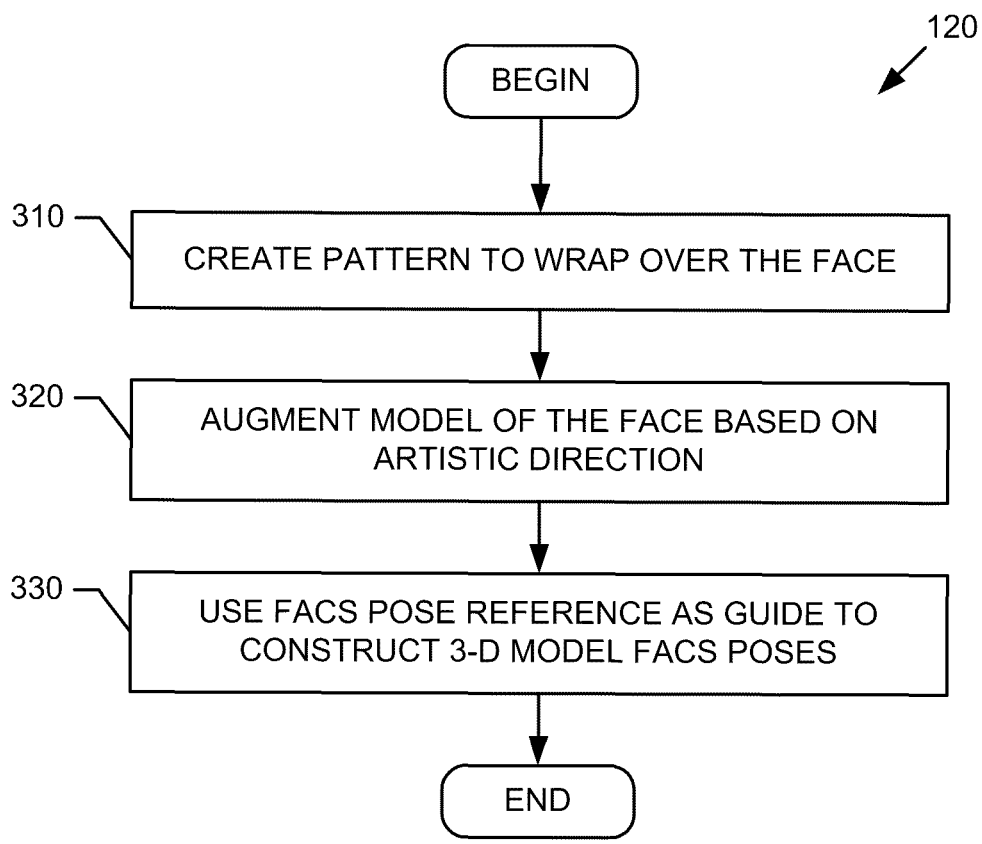
FIG. 3 is a flowchart illustrating a detailed texturing process in accordance with one implementation of the present invention.

FIG. 3 is a flowchart illustrating a detailed texturing process 120 in accordance with one implementation of the present invention. The texturing process 120 includes creating a pattern to wrap over the actor's face with marker dots intact, at box 310. The texturing process 120 also includes augmenting of a model of the actor, at box 320, based on an artistic direction. The model is driven by a system which was used to generate the FACS poses. At box 330, the image and FACS pose reference is used as a guide to construct a set of 3-D model FACS poses to match the intention of each action.

Figure 4:
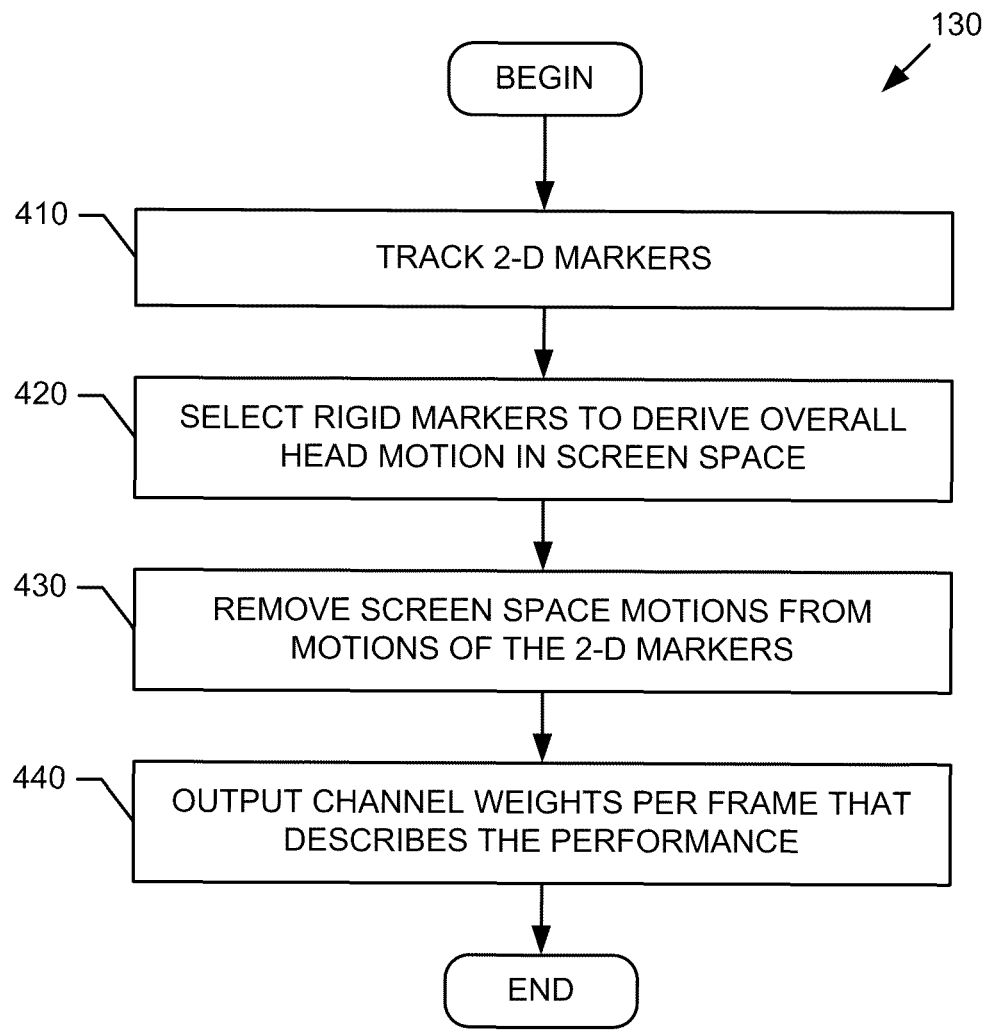
FIG. 4 is a flowchart illustrating a detailed tracking/FACS solving process in accordance with one implementation of the present invention.

FIG. 4 is a flowchart illustrating a detailed tracking/FACS solving process 130 in accordance with one implementation of the present invention. The tracking/FACS solving process 130 includes 2-D marker tracking, at box 410, and selecting a set of rigid markers, at box 420, to derive the overall head motion in a screen space. The screen space motions are then removed from the motions of the 2-D markers, at box 430. As was the case with a head stabilization transform of 3-D markers, a transformation process is needed to stabilize the head calculated from the 2-D markers. However, in the 2-D case, the markers are shown on the flat screen of the video (i.e., the screen space). Therefore, there is a need to compute a stabilization transform from the 3-D space to the 2-D screen space to compute this stabilization. By this stabilization computation, which is mathematically a camera projection, the head orientation and head translation motion is then removed from the motions of the 2-D markers, which makes the 2-D marker motions suitable for a FACS solver. The screen space motions can be a result of camera or head motions. The FACS solver overlays the projected 3-D marker motions and the 2-D marker motions, and pairs up the corresponding points and matches the performance by computing appropriate "blending" weights between the FACS poses. Thus, at box 440, this process outputs a set of weights per pose on every frame.

Figure 5:
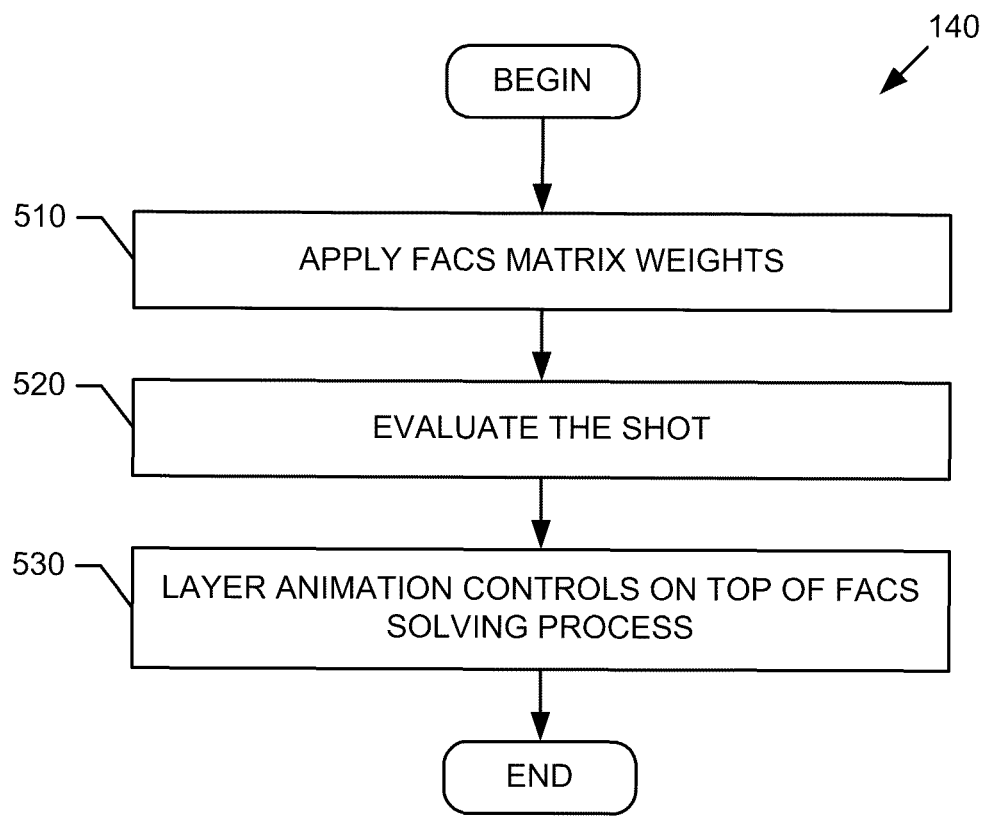
FIG. 5 is a flowchart illustrating a detailed animation process in accordance with one implementation of the present invention.

FIG. 5 is a flowchart illustrating a detailed animation process 140 in accordance with one implementation of the present invention. The animation process 140 includes a shot facial animation process in which FACS matrix weights are applied, at box 510, and the shot is evaluated, at box 520. The animation controls (e.g., by animators) are layered on top of the FACS solving process, at box 530, to augment and enhance the animation.

Figure 6:
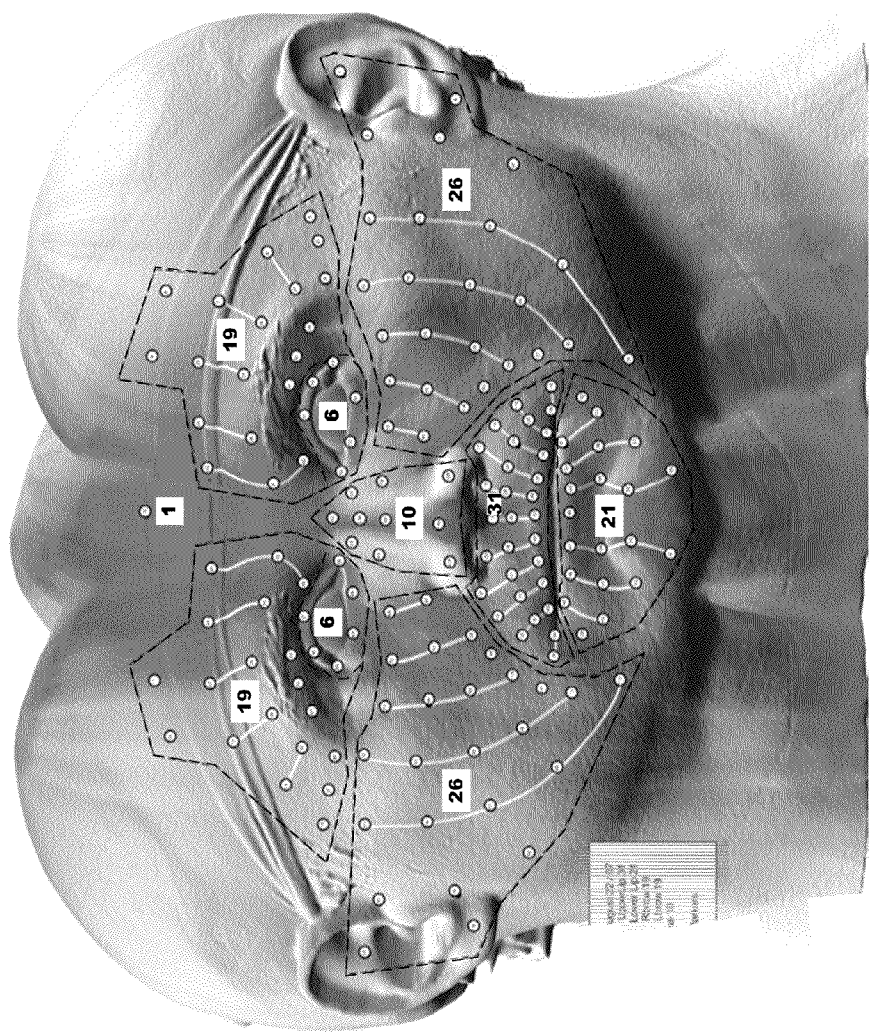
FIG. 6 shows one example layout of marker patterns that accommodate facial surface in accordance with one implementation of the present invention.

FIG. 6 shows one example layout of marker patterns that accommodate facial surface in accordance with one implementation of the present invention. In the illustrated implementation, a 165 marker template on the face is broken down into different facial areas such as a nose area, mouth areas, cheek areas, and areas around the eyes. Thus, in this implementation, ten markers are placed on the nose to highlight the nose surface. However, the number of markers can be increased to provide more stability and better solves. Further, 31 markers are placed on the upper mouth/lip area and 21 markers are place on the lower mouth/lip area. Each cheek area includes 26 markers for a total of 52 markers for the cheek areas. Again, the number of markers in the cheek areas can be increased, especially around ear areas, when performing multiple camera solves. Each brow region includes 19 markers for a total of 38 for the brow regions. Six markers are placed around each eye for a total of 12 for the eye regions. Finally, one marker is placed in the center of the head. A helmet can also be used to solve for head stabilization with additional markers.

Figure 7A:
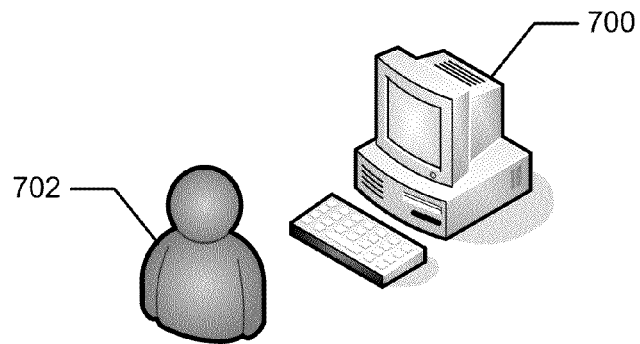
FIG. 7A illustrates a representation of a computer system and a user.

FIG. 7A illustrates a representation of a computer system 700 and a user 702. The user 702 uses the computer system 700 to perform facial motion capture using marker patterns applied on the face of a subject to accommodate the facial surface. The computer system 700 stores and executes the facial motion capture process 790.

Figure 7B:
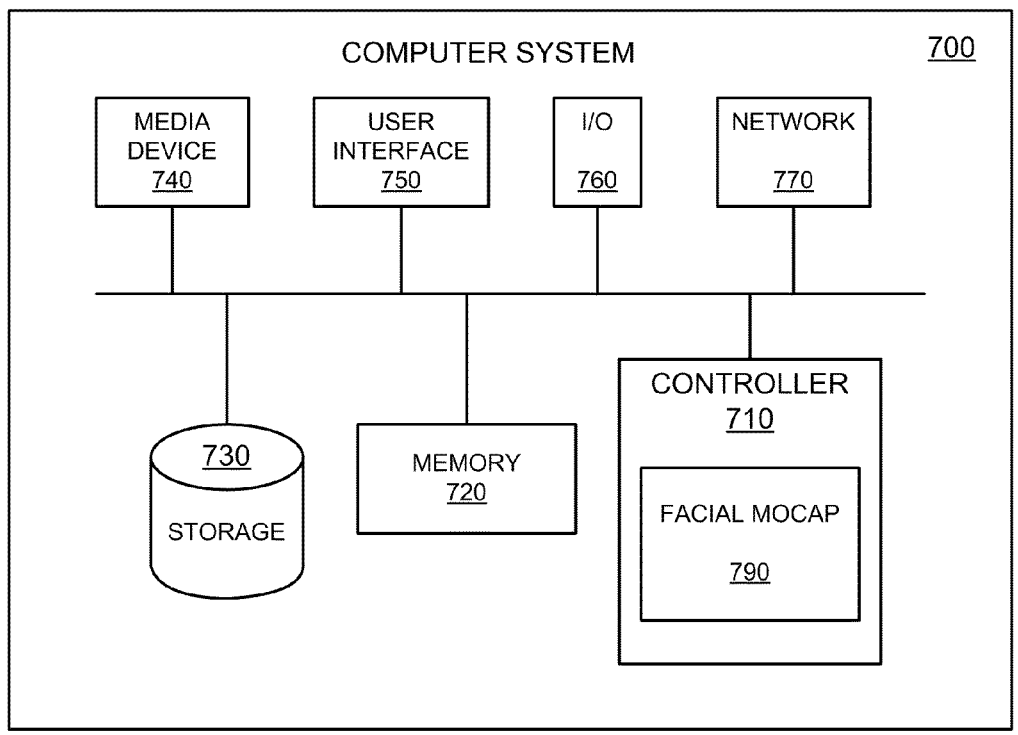
FIG. 7B is a functional block diagram illustrating the computer system hosting the facial motion capture process.

FIG. 7B is a functional block diagram illustrating the computer system 700 hosting the facial motion capture process 790. The controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the facial motion capture process 790 as a software system. Alternatively, this service can be implemented as separate hardware components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data temporarily or long term for use by other components of the computer system 700, such as for storing data used by the facial motion capture process 790. In one implementation, storage 730 is a hard disk drive.

The media device 740 receives removable media and reads and/or writes data to the inserted media. In one implementation, for example, the media device 740 is an optical disc drive.

The user interface 750 includes components for accepting user input from the user of the computer system 700 and presenting information to the user. In one implementation, the user interface 750 includes a keyboard, a mouse, audio speakers, and a display. The controller 710 uses input from the user to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, while the examples here are focused on the face, similar patterns applied to other body parts can also provide improved results. Similarly, the markers need not be optical retro-reflective balls but could be markers drawn or painted onto a surface (e.g., make-up). Alternatively, the markers are not all identical (e.g., different sizes or colors). In another system, the markers are not all optical markers (e.g., RF markers) and instead a pattern of placement is used that takes advantage of the marker type in conjunction with the object characteristics. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method comprising
capturing facial surface using marker patterns laid out on the facial surface by adapting the marker patterns to contours of the facial surface and motion range of a head comprising:

generating a facial action coding system (FACS) matrix by capturing FACS poses;
generating a pattern to wrap over the facial surface using the FACS poses as a guide;
capturing and tracking marker motions of the pattern;
stabilizing the marker motions of the pattern using a head stabilization transform to remove head motions from the marker motions;
generating and applying a plurality of FACS matrix weights to the stabilized marker motions;
tracking and selecting a set of 2-D markers to derive an overall head motion in a 2-D screen space; and
computing a stabilization transform for projecting the marker motions from a 3-D space to the 2-D screen space to stabilize the head calculated from the set of 2-D markers.

2. The method of claim 1, wherein capturing marker motions comprises
capturing 3-D marker motions using triangulation from a multi-camera setup.

3. The method of claim 1, wherein the head stabilization transform transforms positions of the head as the head moves with a body to a locked position around an origin which restricts the marker motions only to facial expressions.

4. The method of claim 1, further comprising
augmenting a model of the head based on an artistic direction.

5. The method of claim 1, further comprising
generating a projected 3-D marker motions and a 2-D marker motions.

6. The method of claim 5, further comprising
overlaying the projected 3-D marker motions and the 2-D marker motions.

7. The method of claim 6, wherein generating a plurality of FACS matrix weights comprises
solving for a weighted combination of predetermined facial muscle activations.

8. The method of claim 7, wherein applying a plurality of FACS matrix weights comprises
applying the weighted combination of predetermined muscle activations to the stabilized marker motions; and
evaluating a shot.

9. A system including a controller to capture facial surface using marker patterns laid out on the facial surface by adapting the marker patterns to contours of the facial surface and motion range of a head, the system comprising:
a facial action coding system (FACS) matrix capturing module configured within the controller to generate FACS matrix by capturing FACS poses;
a texturing module configured within the controller to generate a pattern to wrap over the facial surface using the FACS poses as a guide;
a tracking module configured within the controller to capture and track marker motions of the pattern;
a head stabilization transform configured within the controller to stabilize the marker motions of the pattern to remove head motions from the marker motions;
a plurality of FACS matrix weights configured within the controller to apply to the stabilized marker motions; and
a stabilization transform computed within the controller to project the marker motions from a 3-D space to a 2-D screen space to generate a projected 3-D marker motions and a 2-D marker motions.

10. The system of claim 9, wherein the tracking module further comprises
a module configured within the controller to capture 3-D marker motions using triangulation from a multi-camera setup.

11. The system of claim 9, wherein the tracking module further comprises
a module configured within the controller to track and select a set of 2-D markers to derive an overall head motion in the 2-D screen space.

12. A non-transitory computer-readable medium storing a computer program for capturing facial surface using marker patterns laid out on the facial surface by adapting the marker patterns to contours of the facial surface and motion range of a head, the computer program comprising executable instructions that cause a computer to:
generate a facial action coding system (FACS) matrix by capturing FACS poses;
generate a pattern to wrap over the facial surface using the FACS poses as a guide;
capture and tracking marker motions of the pattern;
stabilize the marker motions of the pattern using a head stabilization transform to remove head motions from the marker motions;
generate and apply a plurality of FACS matrix weights to the stabilized marker motions; and
track and select a set of 2-D markers to derive an overall head motion in a 2-D screen space; and
compute a stabilization transform for projecting the marker motions from a 3-D space to the 2-D screen space to stabilize the head calculated from the set of 2-D markers.

* * * * *